(12) United States Patent
Brust et al.

(10) Patent No.: US 10,861,060 B1
(45) Date of Patent: Dec. 8, 2020

(54) DYNAMICALLY DETERMINING PERSONALIZED PROMOTIONAL OFFERS USING MARKERS

(71) Applicant: Amazon Technologies, Inc., Seattle, WA (US)

(72) Inventors: Joseph Charles Brust, Seattle, WA (US); Shayne Ashlyn Smith, Seattle, WA (US); Joel Ryan Freeman, Seattle, WA (US); Michael Bell Trueman, North Bend, WA (US); Yury Lizunov, Bothell, WA (US); Jason Adrian Galep, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 16/058,581

(22) Filed: Aug. 8, 2018

(51) Int. Cl.
  *G06Q 30/02* (2012.01)
(52) U.S. Cl.
  CPC ..... *G06Q 30/0277* (2013.01); *G06Q 30/0255* (2013.01)
(58) Field of Classification Search
  CPC .................................................... G06Q 30/02
  See application file for complete search history.

(56) References Cited

U.S. PATENT DOCUMENTS

| | | | | |
|---|---|---|---|---|
| 8,484,064 B2* | 7/2013 | Reichman | ........... | G06Q 30/04 705/7.19 |
| 9,262,771 B1* | 2/2016 | Patel | ........... | G06Q 30/0267 |
| 9,754,274 B1* | 9/2017 | Brussin | ........... | G06Q 30/0207 |
| 10,127,564 B2* | 11/2018 | Heath | ........... | G06Q 30/02 |
| 2008/0270579 A1* | 10/2008 | Herz | ........... | G06Q 30/02 709/219 |
| 2013/0231999 A1* | 9/2013 | Emrich | ........... | G06Q 30/0271 705/14.43 |
| 2015/0012358 A1* | 1/2015 | Almendras Riesco | | G06Q 30/0259 705/14.57 |
| 2017/0046732 A1* | 2/2017 | Elmachtoub | ........ | G06Q 30/0243 |

OTHER PUBLICATIONS

Kaspar, Kai; Sarah Lucia Weber; Wilbers, Anne-Kathrin; Personally relevant online advertisements: Effects of demographic targeting on visual attention and brand avaluation; PLoS One 14.2: e3212419, Public Library of Sceince. (Feb. 2019) vol. 12 Issue 2 (Year: 2019).*

* cited by examiner

*Primary Examiner* — Marilyn G Macasiano
(74) *Attorney, Agent, or Firm* — Eversheds Suherland (US) LLP

(57) ABSTRACT

Systems, methods, and computer-readable media are disclosed for dynamically determining personalized promotional offers using markers. In one embodiment, an example method may include determining a first user history associated with a first user account and a second user history associated with a second user account, the first user history and the second user history being indicative of respective interactions by a first user and a second user with a marketplace, receiving an indication of interaction by the first user with a marker associated with a promotional offer campaign, determining, using the first user history, a first promotional offer for the first user, associating the first promotional offer with the first user account, receiving an indication of interaction by the second user with the marker, determining, using the second user history, a second promotional offer for the second user, and associating the second promotional offer with the second user account.

20 Claims, 8 Drawing Sheets

DYNAMICALLY DETERMINING PERSONALIZED PROMOTIONAL OFFERS USING MARKERS

BACKGROUND

Electronic devices may be used to browse and purchase products offered for sale at online marketplaces. Certain online marketplaces may provide users with promotional offers, such as coupons for particular products or brands of products, product giveaways, or gift cards for purchasing products. Such promotional offers may be presented at user devices accessing a website of the online marketplace or may be located on physical objects. In some instances, users may be required to sign up for a particular service or provide personal information in order to receive promotional offers of a particular campaign. Further, in some instances, promotional offers may be provided to certain users or placed at certain locations based on general user demographics and thus may be ineffective with respect to users who do not fit the targeted demographic profile. Online marketplaces may desire to implement promotional offer campaigns in a manner that limits the amount of user input required for users to receive promotional offers and provides promotional offers to users who will likely redeem the offers.

Figure 1A:
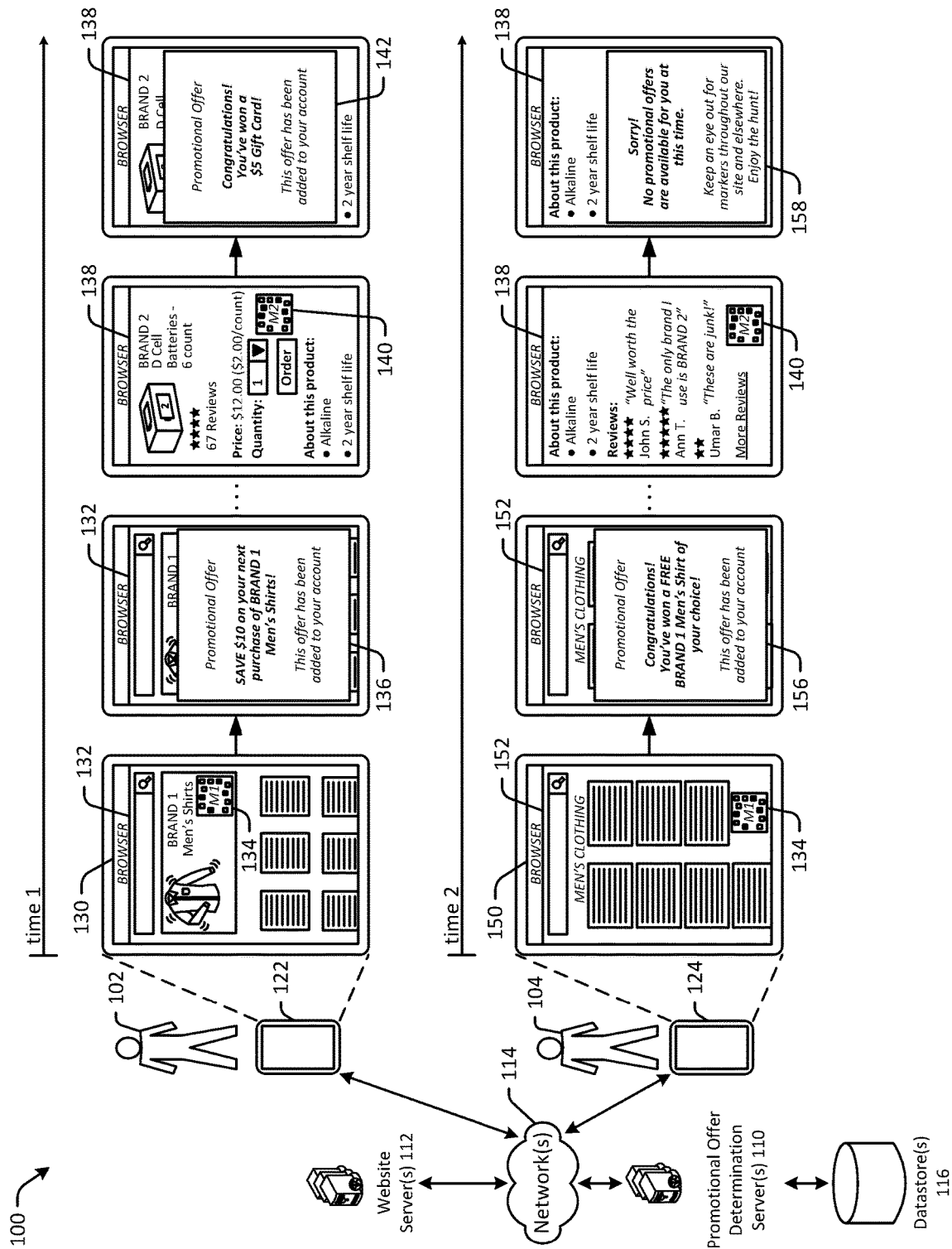
FIG. 1A is a hybrid system and user interface diagram illustrating dynamically determining personalized promotional offers using markers in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Online marketplaces are frequently used to browse and purchase various products offered for sale at a website or in an application. For example, digital content related to products available for sale may be presented at electronic devices, such that users may browse the digital content and interact with the content to purchase such products from the retailer operating the marketplace. Digital content for delivery may include content such as text, images, videos, audio, and other content. Some content may include images of particular products as well as additional product related information. For example, certain content presented at a webpage or in an application of an online marketplace may include images of a particular product or service offered for sale along with information related to the product or service offering. As another example, certain content may include a promotional offer, such as a coupon for a particular product or service or brand thereof, product or service giveaways, or gift cards for purchasing products or services. Content may be provided as part of content campaigns generated by content creators that desire for the content to be consumed or interacted with by users. In some instances, delivery of content may be scheduled based at least in part on content delivery settings or parameters provided by campaign managers and/or content creators. Content delivery settings may include targeting criteria, frequency constraints (e.g., how often a content impression can be presented to a user, etc.), pacing settings (e.g., smooth or linear delivery, time of day delivery, etc.), device type settings (e.g., devices at which impressions are to be served), and the like.

Campaign managers and/or content creators may provide initial content delivery settings or parameters for content associated with a content campaign. The content campaign may include one or more pieces of content, such as different creative materials or different forms or types of content, impressions of which may be delivered or presented to users at electronic devices. One or more remote servers may manage delivery and/or presentation of a set of content over the course of a content campaign. Campaign managers and/or content creators may manage content delivery settings or parameters based at least in part on an expected value that can be derived from serving a content impression to a user. The expected value may be used to determine an amount to pay, such as a bid amount, in order to serve a content impression to a user, and/or for user interactions with served impressions, such as clicks, taps, swipes, etc. In order to optimize usage or expenditure of resources allocated towards content served at electronic devices, campaign managers and/or content creators may desire to determine an accurate value for user viewing and/or user interaction with content presented at electronic devices. Based at least in part on the determination, campaign managers and/or content creators may determine whether or not to change content delivery settings for a particular content campaign in order to increase the effectiveness of the campaign and user interaction with the underlying content.

In the context of promotional offer campaigns, retailers often may require users to sign up for a particular service and/or provide personal information in order to receive and/or redeem promotional offers of a particular campaign.

Certain users may be reluctant to sign up for additional services or provide their personal information, such as an email address or other contact information, particularly when users are not familiar with the retailer. As a result, such promotional offer campaigns may fail to reach users who may be interested in the promotional offers of the campaign. In some instances, promotional offer campaigns may utilize targeting criteria that rely on general user demographics in determining promotional offers to be provided to a group of users who meet a particular demographic profile. Although such targeting techniques may be useful in some circumstances, certain users of the group may be uninterested in the promotional offers received. As a result, such users may begin to ignore promotional offers associated with the campaign or may opt out of receiving future promotional offers of the campaign. Ultimately, the effectiveness of a promotional offer campaign may be limited when the campaign presents undesirable obstacles to users seeking to obtain or redeem promotional offers of the campaign and/or the promotional offers provided by the campaign fail to correspond to the particular interests of users receiving the promotional offers.

In order to optimize usage or expenditure of resources allocated towards supplying promotional offers and implementing a promotional offer campaign, campaign managers and/or content creators may desire to limit the amount of user input required for users to obtain and redeem promotional offers and to provide promotional offers to users who will likely redeem the offers. In this manner, the overall effectiveness of the promotional offer campaign and user experience with the campaign may be improved. Additionally, campaign managers and/or content creators may desire to identify undesirable performance of a particular promotional offer of the campaign and determine whether certain modifications to one or more parameters of the campaign may lead to improved performance.

Embodiments of the disclosure may provide users with personalized promotional offers of a promotional offer campaign in a manner that minimizes user input required to obtain and redeem the offers and enhances user experience with the campaign. Certain embodiments may determine a user history associated with a user account of a user. The user history may be indicative of interactions by the user with a marketplace, such as an e-commerce marketplace. For example, the user history may include a browse history indicative of digital content browsed by the user, a purchase history indicative of products purchased by the user, or other information associated with interactions by the user with the marketplace. Some embodiments may receive an indication of user interaction by the user with a marker associated with a promotional offer campaign. The marker may not be indicative of a promotional offer of the promotional offer campaign. For example, the marker may be a symbol, a combination of symbols, an image, a combination of images, a word, a combination of words, a combination of symbols, images, and/or words, or another form of visual indicator that does not indicate a particular promotional offer of the promotional offer campaign. In some instances, the marker may be a physical marker that is located on a physical object, such as a box, a magazine, or a promotional display. In such instances, the indication of user interaction by the user with the marker may include an image of the marker, such as an image scanned using a camera of a user device. In some instances, the marker may be a digital marker that is presented at a location associated with the marketplace, such as a location on a website of an e-commerce marketplace, which may be accessed by a user device. In such instances, the indication of user interaction by the user with the marker may be indicative of a user selection of the marker, such as the user clicking on the marker. Certain embodiments may determine a promotional offer for the user based at least in part on the user history. For example, the promotional offer may be determined based at least in part on the browse history, the purchase history, or other information included in the user history. Some embodiments may associate the promotional offer with the user account. For example, the promotional offer may be associated with the user account in response to receiving the indication of user interaction by the user with the marker. After the promotional offer is associated with the user account, the promotional offer may be accessible in standard user flows of the marketplace, such as when the user accesses a checkout interface or a shopping cart interface of the marketplace. In this manner, the promotional offer may be easily accessed and redeemed by the user within the marketplace.

As a result, embodiments of the disclosure may provide users with personalized promotional offers of a promotional offer campaign in a manner that minimizes user input required to obtain and redeem the offers and enhances user experience with the campaign. Such personalized promotional offers may improve user experience by providing users with offers that correspond to the interests of the users. Additionally, by automatically associating promotional offers to an existing user account of a user and allowing the user to redeem the offers within the marketplace, embodiments of the disclosure may avoid the hurdles that deter users from participating in certain types of promotional offer campaigns. Further, the limited user input requirements and personalized promotional offers provided by embodiments of the disclosure may allow campaign managers and/or content creators to optimize usage or expenditure of resources allocated towards supplying promotional offers and implementing a promotional offer campaign.

Certain embodiments may determine a first user history associated with a first user account of a first user and a second user history associated with a second user account of a second user. The first user history may be indicative of interactions by the first user with a marketplace, such as an e-commerce marketplace, and the second user history may be indicative of interactions by the second user with the marketplace. Some embodiments may receive a first indication of user interaction by the first user with a first marker associated with a promotional offer campaign. The first marker may not be indicative of a particular promotional offer of the promotional offer campaign. Certain embodiments may determine a first promotional offer for the first user. The first promotional offer may be determined based at least in part on the first user history. Some embodiments may associate the first promotional offer with the first user account. The first promotional offer may be associated with the first user account in response to receiving the first indication of user interaction by the first user with the first marker. In a similar manner, certain embodiments may receive a second indication of user interaction by the second user with the first marker. Some embodiments may determine a second promotional offer for the second user, with the second promotional offer being different from the first promotional offer. The second promotional offer may be determined based at least in part on the second user history. Certain embodiments may associate the second promotional offer with the second user account. The second promotional offer may be associated with the second user account in response to receiving the second indication of user interaction by the second user with the first marker. In this manner, different users may interact with the same marker of the promotional offer campaign, but the users may receive different promotional offers personalized based on their respective user histories.

Certain embodiments may determine a first user history associated with a first user account of a first user and a second user history associated with a second user account of a second user. The first user history may be indicative of interactions by the first user with an e-commerce marketplace, and the second user history may be indicative of interactions by the second user with the e-commerce marketplace. Some embodiments may determine a first location on a website of the e-commerce marketplace for presentation of a first digital marker associated with a promotional offer campaign including a plurality of promotional offers. The first location may be determined based at least in part on the first user history, and the first digital marker may not be indicative of a particular promotional offer of the promotional offer campaign. Certain embodiments may cause presentation of the first digital marker at a first user device associated with the first user, and the first digital marker may be presented at the first location. Some embodiments may receive a first indication of user interaction by the first user with the first digital marker. Certain embodiments may determine a first promotional offer for the first user. The first promotional offer may be determined based at least in part on the first user history and one or more parameters of the promotional offer campaign. The one or more parameters may include at least one of: (i) a frequency parameter indicative of a predetermined frequency for awarding one of the plurality of promotional offers; (ii) a maximum promotional offer parameter indicative of a predetermined maximum number of one of the plurality of promotional offers to be awarded to users; (iii) a maximum promotional offer per user parameter indicative of a predetermined maximum number of one of the plurality of promotional offers to be awarded to a single user; (iv) a timing parameter indicative of a predetermined time period for awarding one of the plurality of promotional offers; or (v) a user location parameter indicative of one or more geographic locations of users for awarding one of the plurality of promotional offers. Some embodiments may associate the first promotional offer with the first user account. The first promotional offer may be associated with the first user account in response to receiving the first indication of user interaction by the first user with the first digital marker.

In a similar manner, certain embodiments may determine a second location on the website for presentation of the first digital marker. The second location may be determined based at least in part on the second user history, and the second location may be different from the first location. Some embodiments may cause presentation of the first digital marker at a second user device associated with the second user, and the first digital marker may be presented at the second location. Certain embodiments may receive a second indication of user interaction by the second user with the first digital marker. Some embodiments may determine a second promotional offer for the second user. The second promotional offer may be determined based at least in part on the second user history and the one or more parameters, and the second promotional offer may be different from the first promotional offer. Certain embodiments may associate the second promotional offer with the second user account. The second promotional offer may be associated with the second user account in response to receiving the second indication of user interaction by the second user with the first digital marker. In this manner, the same marker may be presented to different users at different locations personalized based on their respective user histories, and, in response to interacting with the marker, the users may receive different promotional offers personalized based on their respective user histories and one or more parameters of the promotional offer campaign.

This disclosure relates to, among other things, systems, methods, computer-readable media, techniques, and methodologies for dynamically determining personalized promotional offers using markers, which may include one or more machine learning models, predictive algorithms, and the like. Embodiments may determine a number of user histories associated with respective user accounts of respective users. Each user history may be indicative of interactions by the respective user with a marketplace, such as an e-commerce marketplace. Embodiments may receive indications of respective user interactions by the respective users with a marker associated with a promotional offer campaign. The promotional offer campaign may include a number of different promotional offers, and the marker may not be indicative of a particular promotional offer of the promotional offers. Embodiments may determine promotional offers for the respective users. A promotional offer for a particular user may be determined based at least in part on the respective user history for that user. For example, a promotional offer algorithm may be used to determine a promotional offer for a particular user, and the promotional offer algorithm may utilize one or more aspects of the user history of the user as inputs for determining the promotional offer. In some aspects, the promotional offer algorithm may utilize additional or alternative information, such as one or more parameters of the promotional offer campaign, a location of the marker interacted with by the user, a type of marker interacted with by the user, or other information, as inputs for determining the promotional offer for the user. Embodiments may determine one or more metrics associated with the promotional offer campaign, which may be used to periodically update or modify the promotional offer algorithm over time.

Figure 1B:
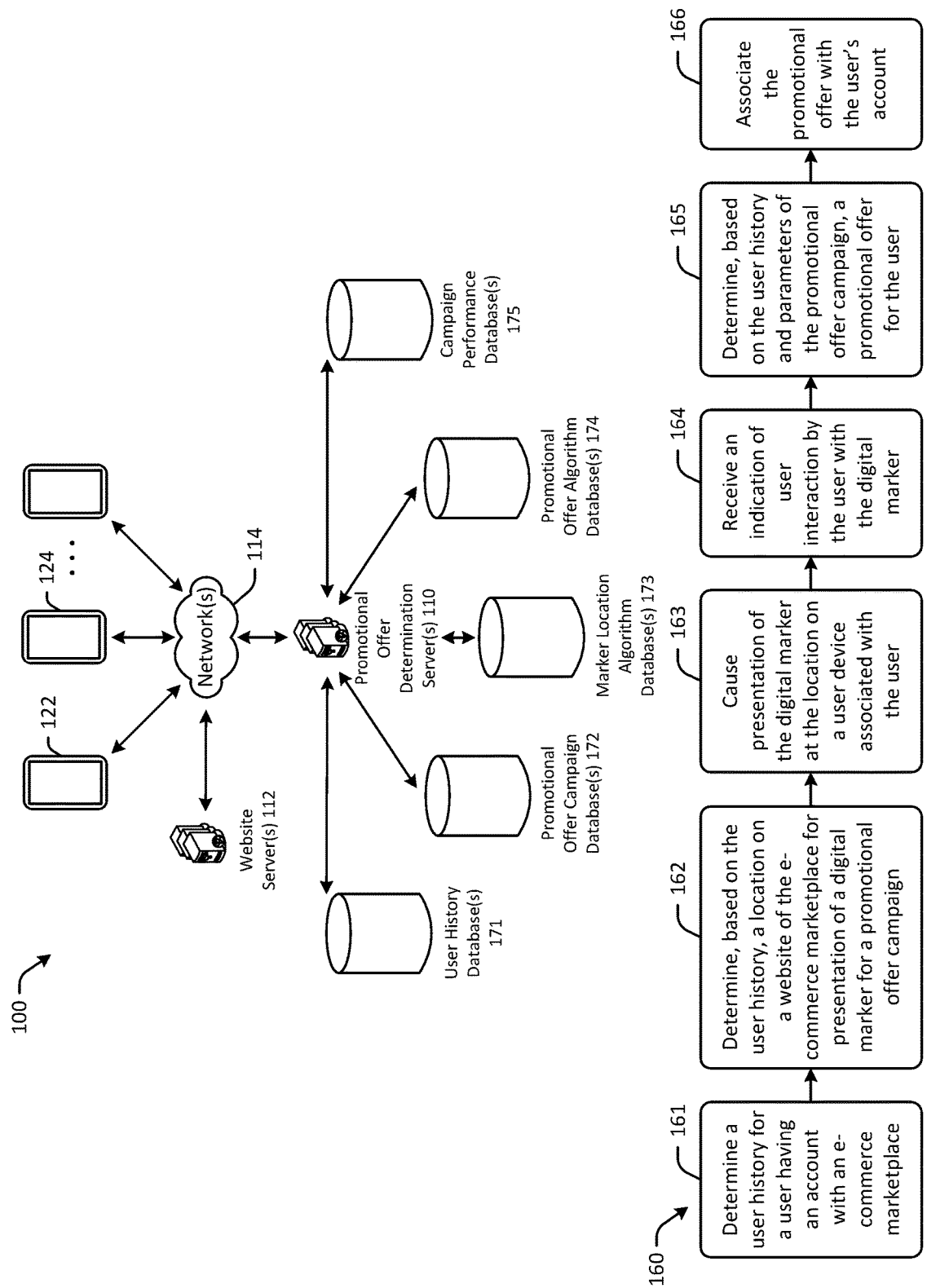
FIG. 1B is a hybrid system and process diagram illustrating dynamically determining personalized promotional offers using markers in accordance with one or more embodiments of the disclosure.
Figure 1C:
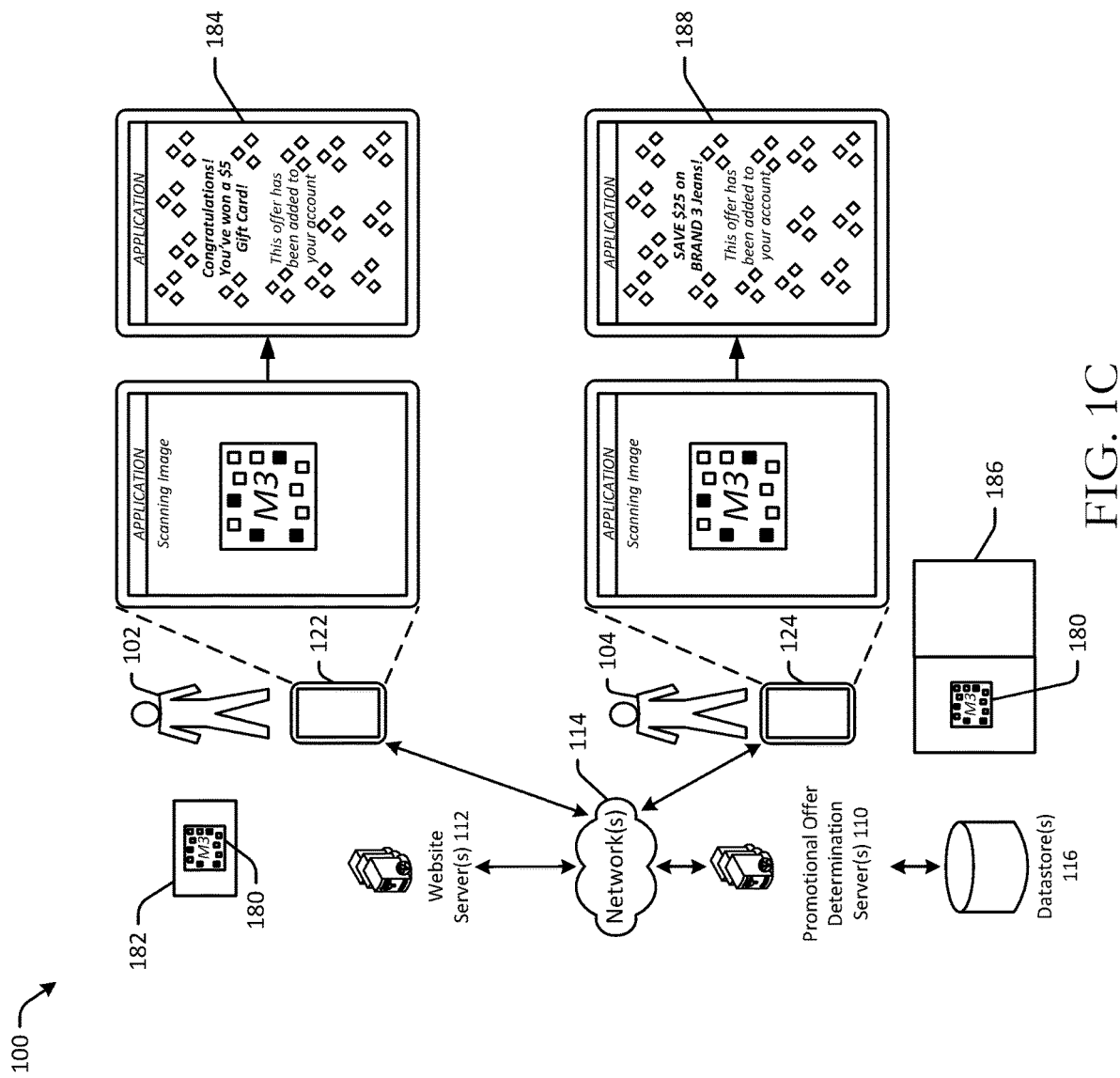
FIG. 1C is a hybrid system and user interface diagram illustrating dynamically determining personalized promotional offers using markers in accordance with one or more embodiments of the disclosure.

Referring to FIGS. 1A-1C, an example system 100 illustrating dynamically determining personalized promotional offers using markers is depicted. The system 100 may include one or more servers and at least one or a plurality of user devices that connects to the server. In the example of FIGS. 1A-1C, one or more promotional offer determination servers 110 may be in communication with one or more user devices. Communication between the promotional offer determination server 110 and the one or more user devices may be facilitated by one or more networks. The one or more user devices may connect to or communicate with the promotional offer determination server 110, on a regular or irregular basis, to receive content from or deliver content to the promotional offer determination server 110. In the example of FIGS. 1A-1C, one or more website servers 112 also may be in communication with product performance determination server 110 and the one or more user devices. Communication between the website server 112 and the promotional offer determination server 110 may be facilitated by one or more networks. The one or more user devices may connect to or communicate with the website server 112, on a regular or irregular basis, to receive content from or deliver content to the website server 112. The one or more user devices may be any type of electronic device used by a user to communicate with the promotional offer determination server 110 and the website server 112. The one or more user devices may communicate with the website server 112 to access one or more websites, such as by executing a web browser on the user device.

In the example of FIGS. 1A-1C, the website server 112 and the promotional offer determination server 110 may be in communication with a first user device 122 associated with a first user 102, and a second user device 124 associated with a second user 104. Communication between the website server 112, the promotional offer determination server 110, and the user devices 122, 124 may be facilitated by one or more network(s) 114. The website server 112 and the promotional offer determination server 110 may be in communication with and deliver content to or receive content from any number of user devices. The promotional offer determination server 110 may use one or more promotional offer algorithms to determine promotional offers for the users 102, 104 at the user devices 122, 124 as well as other users in communication with the promotional offer determination server 110 by user devices. The promotional offer determination server 110 may be in communication with one or more datastore(s) 116, which may store user history information, promotional offer campaign information, one or more marker location algorithms, one or more promotional offer algorithms, campaign performance information, and other information accessible to the promotional offer determination server 110.

Referring to FIG. 1A, the first user device 122 may connect to the one or more networks 114 and receive digital content for presentation at the first user device 122. For example, the first user device 122 may communicate with the website server 112 to access a website, such as a website of an e-commerce marketplace, by executing a web browser on the first user device 122. In the example of FIG. 1A, the first user 102 may access a first webpage 132 of the website, and digital content may be presented at the first user device 122. The first webpage 132 may be a home page of the website. The digital content may be any suitable content, such as text, images, videos, audio, interactive content, and other content related to products offered for sale by the e-commerce marketplace. In some instances, the content may include multiple pieces of content for presentation at respective content delivery slots at the first webpage 132. Certain content impressions may be positioned within a visible area of a browser window 130 of the first user device 122, while other content impressions may be positioned outside of the visible area of the browser window 130 absent the first user 102 scrolling through the first webpage 132. The digital content presented at the first webpage 132 may include content associated with one or more content campaigns related to one or more products or services. In the example of FIG. 1A, the digital content presented at the first webpage 132 may include a first digital marker 134 associated with a promotional offer campaign for the e-commerce marketplace. The promotional offer campaign may include a plurality of promotional offers to be provided to users. In some instances, the promotional offers may include coupons for particular products or brands of products, product giveaways, or gift cards for purchasing products. In some embodiments, the promotional offers may be sponsored by one or more vendors or advertisers associated with the e-commerce marketplace. For example, one or more of the promotional offers may be associated with a particular product or brand of products offered for sale by a particular vendor or marketed by a particular advertiser. In some embodiments, the promotional offers may be provided by an operator of the e-commerce marketplace and may be applicable to any product offered for sale via the marketplace. For example, one or more of the promotional offers may include generic gift cards that may be used toward the purchase of various different products offered for sale via the marketplace. In some embodiments, the promotional offers may be non-transferrable offers. In other words, once a particular promotional offer is associated with a user account of a particular user, the promotional offer may not be transferred to another user for redemption. In some embodiments, the promotional offers may be time-limited offers. In other words, redemption of a particular promotional offer may be limited to a particular period of time after which the promotional offer may expire. One or more digital markers may be associated with the promotional offer campaign. The digital markers may not be indicative of a particular promotional offer of the promotional offer campaign. In other words, each digital marker may be a visual indicator of the promotional offer campaign, but the digital marker may not provide an indication of any one of the promotional offers included in the promotional offer campaign. In some instances, each digital marker may be, or may include, a symbol, a combination of symbols, an image, a combination of images, a word, a combination of words, a combination of symbols, images, and/or words, or another form of visual indicator that does not indicate a particular promotional offer of the promotional offer campaign. As described below, the location on the website at which the first digital marker 134 is presented may be determined by the promotional offer determination server 110. In the example of FIG. 1A, the first user 102 may interact with the first digital marker 134 presented at the first webpage 132. For example, the first user 102 may select the first digital marker 134 by clicking or tapping on the first digital marker 134.

An indication of the user interaction by the first user 102 with the first digital marker 134 may be sent by the first user device 122 to the promotional offer determination server 110. In response to receiving the indication of the user interaction by the first user 102 with the first digital marker 134, the promotional offer determination server 110 may cause first promotional offer content 136 to be presented at the first user device 122. The first promotional offer content 136 may be indicative of a first promotional offer for the first user 102. For example, the first promotional offer content 136 may include a description of the first promotional offer (e.g., "SAVE $10 on your next purchase of BRAND 1 Men's Shirts!"). As described below, the promotional offer determination server 110 may determine the first promotional offer for the first user 102. In other words, the promotional offer determination server 110 may determine to provide the first user 102 with the first promotional offer instead of other available promotional offers of the promotional offer campaign. The first promotional offer content 136 also may include an indication that the first promotional offer has been associated with a first user account of the first user 102 established with the e-commerce marketplace (e.g., "This offer has been added to your account"). As described below, the promotional offer determination server 110 may cause the first promotional offer to be associated with the first user account in response to receiving the indication of the user interaction by the first user 102 with the first digital marker 134. After the first promotional offer has been associated with the first user account, the first promotional offer may be accessible in standard user flows of the e-commerce marketplace, such as when the first user 102 accesses a checkout interface or a shopping cart interface of the marketplace. In this manner, the first user 102 may access and redeem the first promotional offer within the e-commerce marketplace, either immediately after the first promotional offer has been associated with the first user account or at a later point in time. In some embodiments, the first user 102 may obtain the first promotional offer and redeem the first promotional offer using different user devices. For example, the first user 102 may use the first user device 122 to obtain the first promotional offer and subsequently may use a different user device to access the e-commerce marketplace and redeem the first promotional offer.

In the example of FIG. 1A, the first user 102 may subsequently access a second webpage 138 of the website of the e-commerce marketplace, and digital content may be presented at the first user device 122. The second webpage 138 may be a product detail page of the website. The digital content presented at the second webpage 138 may include various pieces of content related to a particular product (e.g., "BRAND 2 D Cell Batteries—6 count"). For example, the content presented at the second webpage 138 may include various types of product related information and selectable items to facilitate ordering of the product. In the example of FIG. 1A, the digital content presented at the second webpage 138 also may include a second digital marker 140 associated with a promotional offer campaign. The second digital marker 140 may be different from the first digital marker 134. For example, the visual appearance of the second digital marker 140 may be different from the visual appearance of the first digital marker 134. In some instances, the second digital marker 140 and the first digital marker 134 may be associated with different promotional offer campaigns. In other instances, the second digital marker 140 and the first digital marker 134 may be associated with the same promotional offer campaign. As described below, the location on the website at which the second digital marker 140 is presented may be determined by the promotional offer determination server 110. In the example of FIG. 1A, the first user 102 may interact with the second digital marker 140 presented at the second webpage 138. For example, the first user 102 may select the second digital marker 140 by clicking or tapping on the second digital marker 140.

An indication of the user interaction by the first user 102 with the second digital marker 140 may be sent by the first user device 122 to the promotional offer determination server 110. In response to receiving the indication of the user interaction by the first user 102 with the second digital marker 140, the promotional offer determination server 110 may cause second promotional offer content 142 to be presented at the first user device 122. The second promotional offer content 142 may be indicative of a second promotional offer for the first user 102. For example, the second promotional offer content 142 may include a description of the second promotional offer (e.g., "You've won a $5 Gift Card!"). As described below, the promotional offer determination server 110 may determine the second promotional offer for the first user 102. In other words, the promotional offer determination server 110 may determine to provide the first user 102 with the second promotional offer instead of other available promotional offers of the promotional offer campaign. The second promotional offer content 142 also may include an indication that the second promotional offer has been associated with the first user account of the first user 102 (e.g., "This offer has been added to your account"). As described below, the promotional offer determination server 110 may cause the second promotional offer to be associated with the first user account in response to receiving the indication of the user interaction by the first user 102 with the second digital marker 140. After the second promotional offer has been associated with the first user account, the second promotional offer may be accessible in standard user flows of the e-commerce marketplace such that the first user 102 may access and redeem the second promotional offer within the marketplace.

In a similar manner, the second user device 124 may connect to the one or more networks 114 and receive digital content for presentation at the second user device 124. For example, the second user device 124 may communicate with the website server 112 to access a website, such as the website of the e-commerce marketplace, by executing a web browser on the second user device 124. In the example of FIG. 1A, the second user 104 may access a third webpage 152 of the website, and digital content may be presented at the second user device 124. The third webpage 152 may be a product category page of the website. The digital content may be any suitable content, such as text, images, videos, audio, interactive content, and other content related to a category of products (e.g., "Men's Clothing") offered for sale by the e-commerce marketplace. In some instances, the content may include multiple pieces of content for presentation at respective content delivery slots at the third webpage 152. Certain content impressions may be positioned within a visible area of a browser window 150 of the second user device 124, while other content impressions may be positioned outside of the visible area of the browser window 150 absent the second user 104 scrolling through the third webpage 152. The digital content presented at the third webpage 152 may include content associated with one or more content campaigns related to one or more products or services. In the example of FIG. 1A, the digital content presented at the third webpage 152 may include the first digital marker 134 associated with the promotional offer campaign for the e-commerce marketplace. In other words, the digital marker presented at the third webpage 152 for the second user 104 may be the same digital marker presented at the first webpage 132 for the first user 102. As described below, the location on the website at which the first digital marker 134 is presented may be determined by the promotional offer determination server 110. In the example of FIG. 1A, the second user 104 may interact with the first digital marker 134 presented at the third webpage 152. For example, the second user 104 may select the first digital marker 134 by clicking or tapping on the first digital marker 134.

An indication of the user interaction by the second user 104 with the first digital marker 134 may be sent by the second user device 124 to the promotional offer determination server 110. In response to receiving the indication of the user interaction by the second user 104 with the first digital marker 134, the promotional offer determination server 110 may cause third promotional offer content 156 to be presented at the second user device 124. The third promotional offer content 156 may be indicative of a third promotional offer for the second user 104. For example, the third promotional offer content 156 may include a description of the third promotional offer (e.g., "You've won a FREE BRAND 1 Men's Shirts of your choice!"). As described below, the promotional offer determination server 110 may determine the third promotional offer for the second user 104. In other words, the promotional offer determination server 110 may determine to provide the second user 104 with the third promotional offer instead of other available promotional offers of the promotional offer campaign. In the example of FIG. 1A, although the first user 102 and the second user 104 both interacted with the first digital marker 134 (presented at different locations on the website), the users 102, 104 received different promotional offers of the promotional offer campaign, as determined by the promotional offer determination server 110. The third promotional offer content 156 also may include an indication that the third promotional offer has been associated with a second user account of the second user 104 established with the e-commerce marketplace (e.g., "This offer has been added to your account"). As described below, the promotional offer determination server 110 may cause the third promotional offer to be associated with the second user account in response to receiving the indication of the user interaction by the second user 104 with the first digital marker 134. After the third promotional offer has been associated with the second user account, the third promotional offer may be accessible in standard user flows of the e-commerce marketplace such that the second user 104 may access and redeem the first promotional offer within the marketplace.

In the example of FIG. 1A, the second user 104 may subsequently access the second webpage 138 of the website of the e-commerce marketplace, and digital content may be presented at the second user device 124. As described above, the second webpage 138 may be a product detail page of the website, including various pieces of content related to the "BRAND 2 D Cell Batteries—6 count" product. In the example of FIG. 1A, the digital content presented at the second webpage 138 for the second user 104 also may include the second digital marker 140 associated with the promotional offer campaign. In other words, the digital marker presented at the second webpage 138 for the second user 104 may be the same digital marker presented at the second webpage 138 for the first user 102. However, the location of the second digital marker 140 presented at the second webpage 138 for the second user 104 may be different from the location of the second digital marker 140 presented at the second webpage 138 for the first user 102. According to the illustrated example, for the first user 102, the second digital marker 140 may be presented at a first location that is adjacent the selectable elements for ordering the product and viewable within the visible area of the browser window 130 without the first user 102 having to scroll through the second webpage 138. In contrast, for the second user 104, the second digital marker 140 may presented at a second location that is adjacent user review content for the product and is not viewable within the visible area of the browser window 150 absent the second user 104 scrolling through the second webpage 138. As described below, the location on the website at which the second digital marker 140 is presented may be determined by the promotional offer determination server 110. In the example of FIG. 1A, the second user 104 may interact with the second digital marker 140 presented at the second webpage 138. For example, the second user 104 may select the second digital marker 140 by clicking or tapping on the second digital marker 140.

An indication of the user interaction by the second user 104 with the second digital marker 140 may be sent by the second user device 124 to the promotional offer determination server 110. In response to receiving the indication of the user interaction by the second user 104 with the second digital marker 140, the promotional offer determination server 110 may cause fourth promotional offer content 158 to be presented at the second user device 124. The fourth promotional offer content 158 may indicate that no promotional offer is to be provided to the second user 104 for the user interaction by the second user 104 with the second digital marker 140. For example, the fourth promotional offer content 158 may include a message indicating that no promotional offer is to be provided to the second user 104 (e.g., "No promotional offers are available for you at this time."). In the example of FIG. 1A, although the first user 102 and the second user 104 both interacted with the second digital marker 140 (presented at different locations on the same webpage of the website), only the first user 102 received a promotional offer of the promotional offer campaign, as determined by the promotional offer determination server 110. In some aspects, the fourth promotional offer content 158 also may include a message encouraging the second user 104 to continue searching for additional markers associated with the promotional offer campaign (e.g., "Keep an eye out for markers throughout our site and elsewhere. Enjoy the hunt!").

To determine the personalized promotional offers for users interacting with the website of the e-commerce marketplace, the promotional offer determination server 110 may execute one or more process flows. For example, an example process flow 160 for dynamically determining personalized promotional offers using markers is depicted in FIG. 1B.

At block 161 of the process flow 160, the promotional offer determination server 110 may determine a user history for a user having a user account established with a marketplace, such as an e-commerce marketplace. In some embodiments, the user history for the user may be determined in response to the promotional offer determination server 110 receiving an indication that a user device associated with the user has accessed a website of the e-commerce marketplace. For example, upon accessing the website, the user device may send an indication of the user device accessing the website to the promotional offer determination server 110. The indication may include a user account identifier that is associated with the user account. In some embodiments, the user account identifier may be an alphanumeric value. In some embodiments, the promotional offer determination server 110 may determine the user history using the user account identifier and one or more user history database(s) 171 accessible to the promotional offer determination server 110. The user history database 171 may store user history information that is indicative of interactions by the user and other users with the e-commerce marketplace. In some embodiments, the user history for the user may include a browse history associated with the user account and indicative of digital content browsed by the user, a purchase history associated with the user account and indicative of products purchased by the user, a marker interaction history associated with the user account and indicative of user interactions by the user with markers associated with one or more promotional offer campaigns, a promotional offer history associated with the user account and indicative of promotional offers of one or more promotional offer campaigns provided to and/or redeemed by the user, and/or other types of user history information. In some embodiments, the user history may be stored in a mapping table or other data structure in which each entry of user history information is associated with the user account identifier of the user. The user history database 171 may store respective user histories for each user having a user account established with the e-commerce marketplace.

At block 162 of the process flow 160, the promotional offer determination server 110 may determine a location on the website of the e-commerce marketplace for presentation of a digital marker of a promotional offer campaign. In some embodiments, the location may be determined in response to the promotional offer determination server 110 receiving the indication that the user device associated with the user has accessed the website. In some embodiments, the location may be determined based at least in part on the user history of the user. For example, the location may be determined based at least in part on one or more, or all, of the browse history, the purchase history, the marker interaction history, and the promotional offer history of the user. In some embodiments, the promotional offer determination server 110 may determine one or more campaign parameters of the promotional offer campaign using a campaign identifier and one or more promotional offer campaign database(s) 172 accessible to the promotional offer determination server 110. In some embodiments, the campaign identifier may be an alphanumeric value. The campaign parameters may be predefined parameters that may be selected and/or modified by campaign managers and/or content creators associated with the promotional offer campaign. In some embodiments, the campaign parameters may include one or more marker location parameters indicative of one or more locations or types of locations on the website at which markers associated with the promotional offer campaign may be presented. In such embodiments, the location may be determined based at least in part on the user history of the user and the one or more marker location parameters. In some embodiments, the promotional offer determination server 110 may use a marker location algorithm to determine the location on the website for presentation of the digital marker. In some embodiments, the marker location algorithm for the promotional offer campaign may be stored at one or more marker location algorithm database(s) 173 accessible to the promotional offer determination server 110. The marker location algorithm may receive the user history of the user and the one or more campaign parameters as inputs and may output the location for presentation of the digital marker. In some embodiments, the marker location algorithm may utilize respective weights associated with the inputs, and the weights may be modified periodically based at least in part on one or more performance metrics associated with the promotional offer campaign.

At block 163 of the process flow 160, the promotional offer determination server 110 may cause a presentation of the digital marker at the user device associated with the user. The digital marker may be presented at the location on the website determined by the promotional offer determination server 110 for the user. For example, the promotional offer determination server 110 may send to the user device an indication to present the digital marker at the location.

At block 164 of the process flow 160, the promotional offer determination server 110 may receive an indication of user interaction by the user with the digital marker. For example, the user device may send the indication of user interaction to the promotional offer determination server 110 in response to the user device determining that the user interacted with the digital marker. In some embodiments, the indication of user interaction may be indicative of a user selection of the digital marker.

At block 165 of the process flow 160, the promotional offer determination server 110 may determine a promotional offer for the user. In some embodiments, the promotional offer may be determined before the promotional offer determination server 110 receives the indication of user interaction by the user with the digital marker. In other embodiments, the promotional offer may be determined after the promotional offer determination server 110 receives the indication of user interaction by the user with the digital marker. In other words, the promotional offer may be determined in response to the promotional offer determination server 110 receiving the indication of user interaction by the user with the digital marker. In some embodiments, the promotional offer may be determined based at least in part on the user history of the user. For example, the promotional offer may be determined based at least in part on one or more, or all, of the browse history, the purchase history, the marker interaction history, and the promotional offer history of the user. In some embodiments, the purchase history may indicate a number of product purchases initiated by the user during a particular time period, and the number of product purchases may be used in determining the promotional offer for the user. In one example, a higher number of product purchases may result in a higher-value promotional offer being determined for the user, whereas a lower number of product purchases may result in a lower-value promotional offer being determined for the user. In some embodiments, the marker interaction history may indicate a number of markers interacted with by the user during a particular time period, and the number of marker interactions may be used in determining the promotional offer for the user. In one example, a higher number of marker interactions may result in a lower-value promotional offer being determined for the user, whereas a lower number of marker interactions may result in a higher-value promotional offer being determined for the user. In some embodiments, the promotional offer history may indicate a number of promotional offers redeemed by the user during a particular time period, and the number of promotional offer redemptions may be used in determining the promotional offer for the user. In one example, a higher number of promotional offer redemptions may result in a higher-value promotional offer being determined for the user, whereas a lower number of promotional offer redemptions may result in a lower-value promotional offer being determined for the user. In some embodiments, the promotional offer determination server 110 may determine one or more campaign parameters of the promotional offer campaign using the campaign identifier and the promotional offer campaign database 172. In some embodiments, the campaign parameters may include one or more frequency parameters indicative of predetermined frequencies for awarding respective promotional offers of the promotional offer campaign to users, one or more maximum promotional offer parameters indicative of predetermined maximum numbers of the respective promotional offers to be awarded to users, one or more maximum promotional offer per user parameters indicative of predetermined maximum numbers of the respective promotional offers to be awarded to a single user, one or more timing parameters indicative of one or more predetermined time periods for awarding the respective promotional offers to users, one or more user location parameters indicative of one or more geographic locations of users for awarding the respective promotional offers to users, and/or other predefined parameters related to awarding the promotional offers of the promotional offer campaign. In some embodiments, the promotional offer for the user may be determined based at least in part on the location on the website at which the digital marker was presented for the user. In some embodiments, the promotional offer determination server 110 may use a promotional offer algorithm to determine the promotional offer for the user. In some embodiments, the promotional offer algorithm for the promotional offer campaign may be stored at one or more promotional offer algorithm database(s) 174 accessible to the promotional offer determination server 110. The promotional offer algorithm may receive the user history of the user, the one or more campaign parameters, and/or the location of the presentation of the digital marker as inputs and may output the promotional offer. In some embodiments, the promotional offer algorithm may utilize respective weights associated with the inputs, and the weights may be modified periodically based at least in part on one or more performance metrics associated with the promotional offer campaign. The performance metrics for the promotional offer campaign may be stored at one or more campaign performance database(s) 175 accessible to the promotional offer determination server 110. In some embodiments, a first weight may be associated with a first input variable, such as a number of product purchases, and a second weight may be associated with a second input variable, such as a number of marker interactions. In one example, upon analyzing the performance metrics for the campaign, the promotional offer determination server 110 may modify the respective weights such that the first weight is greater than the second weight. As a result, the first input variable may have a greater influence than the second input variable on promotional offers determined using the promotional offer algorithm.

At block 166 of the process flow 160, the promotional offer determination server 110 may associate the promotional offer with the user account of the user. In some embodiments, the promotional offer may be associated with the user account in response to the promotional offer determination server 110 receiving the indication of user interaction by the user with the digital marker. After the promotional offer has been associated with the user account, the promotional offer may be accessible in standard user flows of the e-commerce marketplace such that the user may access and redeem the promotional offer within the marketplace.

In the example of FIGS. 1A-1C, the user devices 122, 124 also may be used with physical markers located on physical objects. Referring to FIG. 1C, the first user device 122 may utilize an application of the e-commerce marketplace and a camera of the first user device 122 to capture images of physical markers located on physical objects. According to the illustrated embodiment, the first user 102 may identify a first physical marker 180 located on a first physical object 182 and associated with a promotional offer campaign of the e-commerce marketplace. In one example, the first physical object 182 may be a box containing a product purchased by the first user 102 from the e-commerce marketplace. Using the application and the camera of the first user device 122, the first user 102 may interact with the first physical marker 180. In the example of FIG. 1C, the first user 102 may use the application and the camera to scan and capture an image of the first physical marker 180 on the first physical object 182. The first user device 122 then may send an indication of the user interaction with first physical marker 180 to the promotional offer determination server 110 via the one or more networks 114. In some embodiments, the indication of the user interaction may include the image of the first physical marker 180. In a manner similar to that described above, the promotional offer determination server 110 may determine a promotional offer for the first user 102. In some embodiments, the promotional offer for the first user 102 may be determined based at least in part on the user history of the first user 102, one or more campaign parameters of the promotional offer campaign, and/or a type of object on which the first physical marker 180 is located. In response to receiving the indication of the user interaction, the promotional offer determination server 110 may cause first promotional offer content 184 to be presented at the first user device 102. In some embodiments, the first promotional offer content 184 may include first augmented reality content indicative of the first promotional offer. Further, in response to receiving the indication of the user interaction, the promotional offer determination server 110 may associate the first promotional offer with the user account of the first user 102.

In a similar manner, the second user device 124 may utilize the application of the e-commerce marketplace and a camera of the second user device 124 to capture images of physical markers located on physical objects. According to the illustrated embodiment, the second user 104 may identify the first physical marker 180 located on a second physical object 186 and associated with the promotional offer campaign of the e-commerce marketplace. In one example, the second physical object 186 may be a magazine including an advertisement associated with the e-commerce marketplace. Using the application and the camera of the second user device 124, the second user 104 may interact with the first physical marker 180. In the example of FIG. 1C, the second user 104 may use the application and the camera to scan and capture an image of the first physical marker 180 on the second physical object 186. The second user device 124 then may send an indication of the user interaction with first physical marker 180 to the promotional offer determination server 110 via the one or more networks 114. In some embodiments, the indication of the user interaction may include the image of the first physical marker 180. In a manner similar to that described above, the promotional offer determination server 110 may determine a promotional offer for the second user 104. In some embodiments, the promotional offer for the second user 104 may be determined based at least in part on the user history of the second user 104, one or more campaign parameters of the promotional offer campaign, and/or a type of object on which the first physical marker 180 is located. In response to receiving the indication of the user interaction, the promotional offer determination server 110 may cause second promotional offer content 188 to be presented at the second user device 104. In some embodiments, the second promotional offer content 188 may include second augmented reality content indicative of the second promotional offer. Further, in response to receiving the indication of the user interaction, the promotional offer determination server 110 may associate the second promotional offer with the user account of the second user 104.

By implementing the process of determining user histories associated with respective user accounts of respective users, receiving indications of respective user interactions by the respective users with markers associated with a promotional offer campaign, determining promotional offers for the respective users based at least in part on the user histories, and automatically associating the promotional offers with the user accounts of the respective users, embodiments of the disclosure may provide users with personalized promotional offers of a promotional offer campaign in a manner that minimizes user input required to obtain and redeem the offers and enhances user experience with the campaign, while also allowing campaign managers and/or content creators to optimize usage or expenditure of resources allocated towards supplying promotional offers and implementing a promotional offer campaign.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
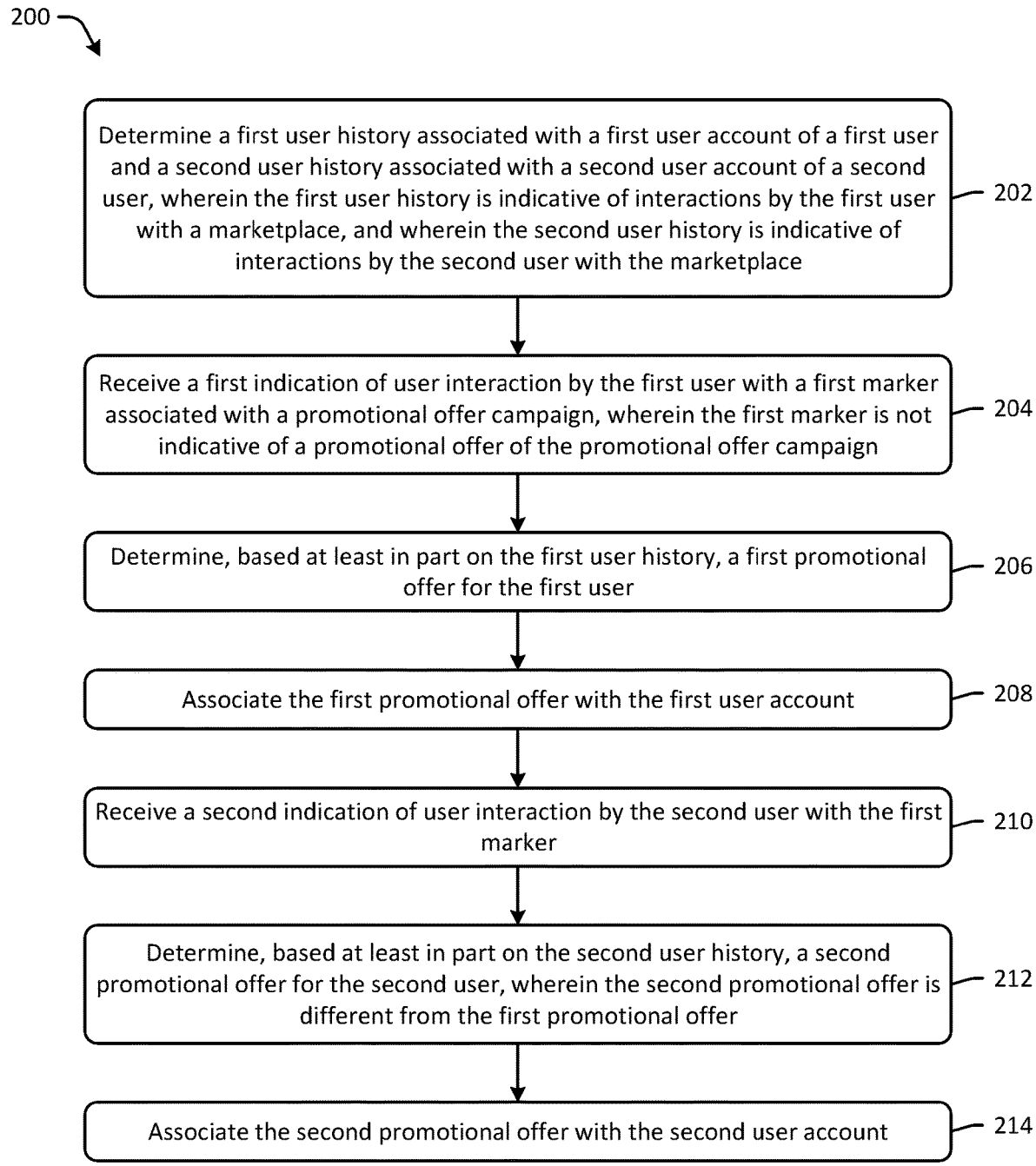
FIG. 2 is an example process flow diagram for dynamically determining personalized promotional offers using markers in accordance with one or more embodiments of the disclosure.

Referring to FIG. 2, an example process flow 200 for dynamically determining personalized promotional offers using markers in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as a promotional offer determination server.

At block 202 of the process flow 200, a first user history associated with a first user account of a first user and a second user history associated with a second user account of a second user may be determined. For example, computer-executable instructions of one or more promotional offer determination module(s) stored at a server may be executed to determine a first user history associated with a first user account of a first user and a second user history associated with a second user account of a second user. The first user history may be indicative of interactions by the first user with a marketplace, such as an e-commerce marketplace, and the second user history may be indicative of interactions by the second user with the marketplace.

At block 204 of the process flow 200, a first indication of user interaction by the first user with a first marker associated with a promotional offer campaign may be received. For example, computer-executable instructions of one or more promotional offer determination module(s) stored at a server may be executed to receive a first indication of user interaction by the first user with a first marker associated with a promotional offer campaign. The first marker may not be indicative of a promotional offer of the promotional offer campaign.

At block 206 of the process flow 200, a first promotional offer for the first user may be determined. For example, computer-executable instructions of one or more promotional offer determination module(s) stored at a server may be executed to determine a first promotional offer for the first user. The first promotional offer may be determined based at least in part on the first user history.

At block 208 of the process flow 200, the first promotional offer may be associated with the first user account. For example, computer-executable instructions of one or more promotional offer determination module(s) stored at a server may be executed to associate the first promotional offer with the first user account.

At block 210 of the process flow 200, a second indication of user interaction by the second user with the first marker may be received. For example, computer-executable instructions of one or more promotional offer determination module(s) stored at a server may be executed to receive a second indication of user interaction by the second user with the first marker.

At block 212 of the process flow 200, a second promotional offer for the second user may be determined. For example, computer-executable instructions of one or more promotional offer determination module(s) stored at a server may be executed to determine a second promotional offer for the second user. The second promotional offer may be determined based at least in part on the second user history. The second promotional offer may be different from the first promotional offer.

At block 214 of the process flow 200, the second promotional offer may be associated with the second user account. For example, computer-executable instructions of one or more promotional offer determination module(s) stored at a server may be executed to associate the second promotional offer with the second user account.

Figure 3A:
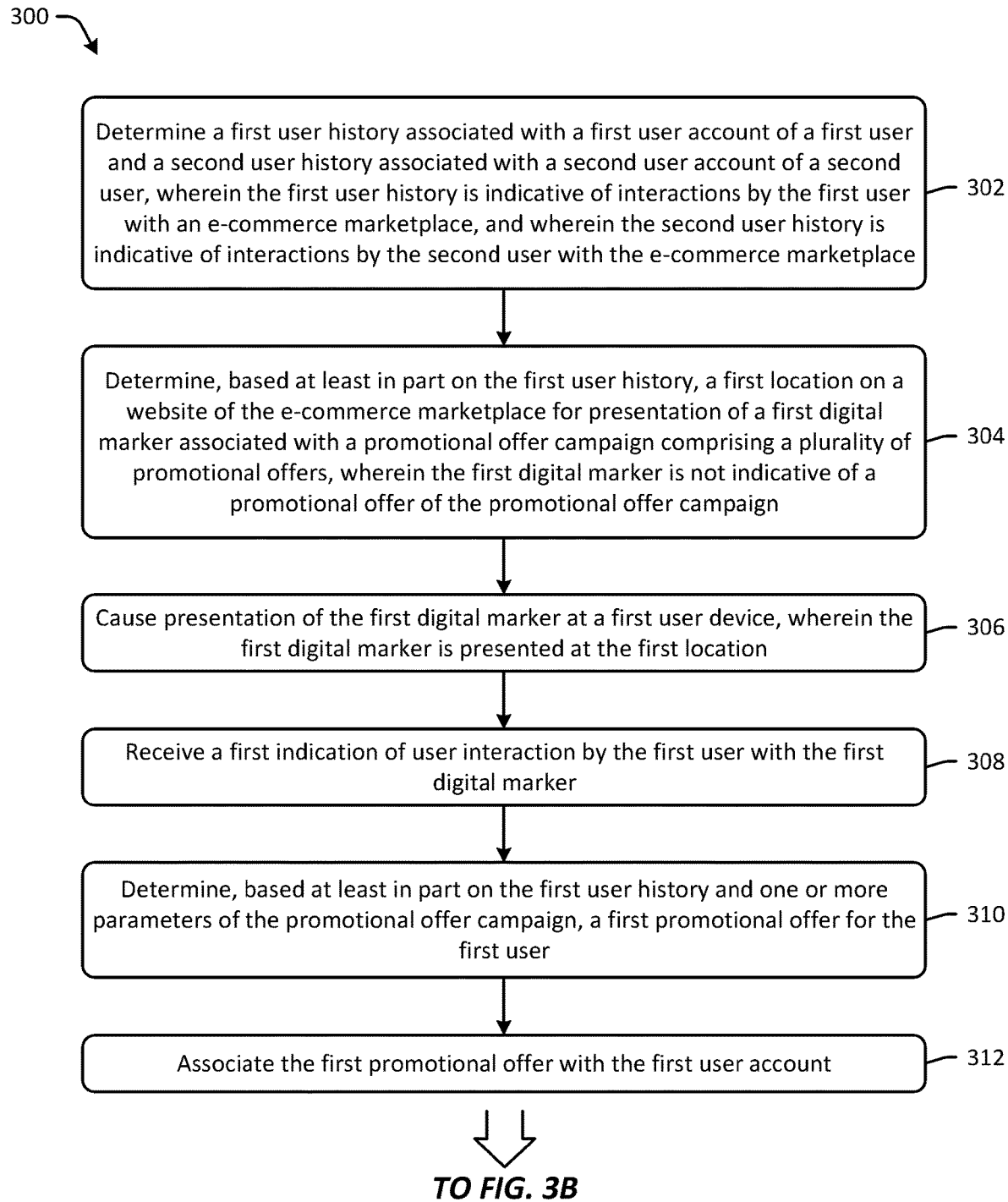
FIGS. 3A-3B are an example process flow diagram for dynamically determining personalized promotional offers using markers in accordance with one or more embodiments of the disclosure.
Figure 3B:
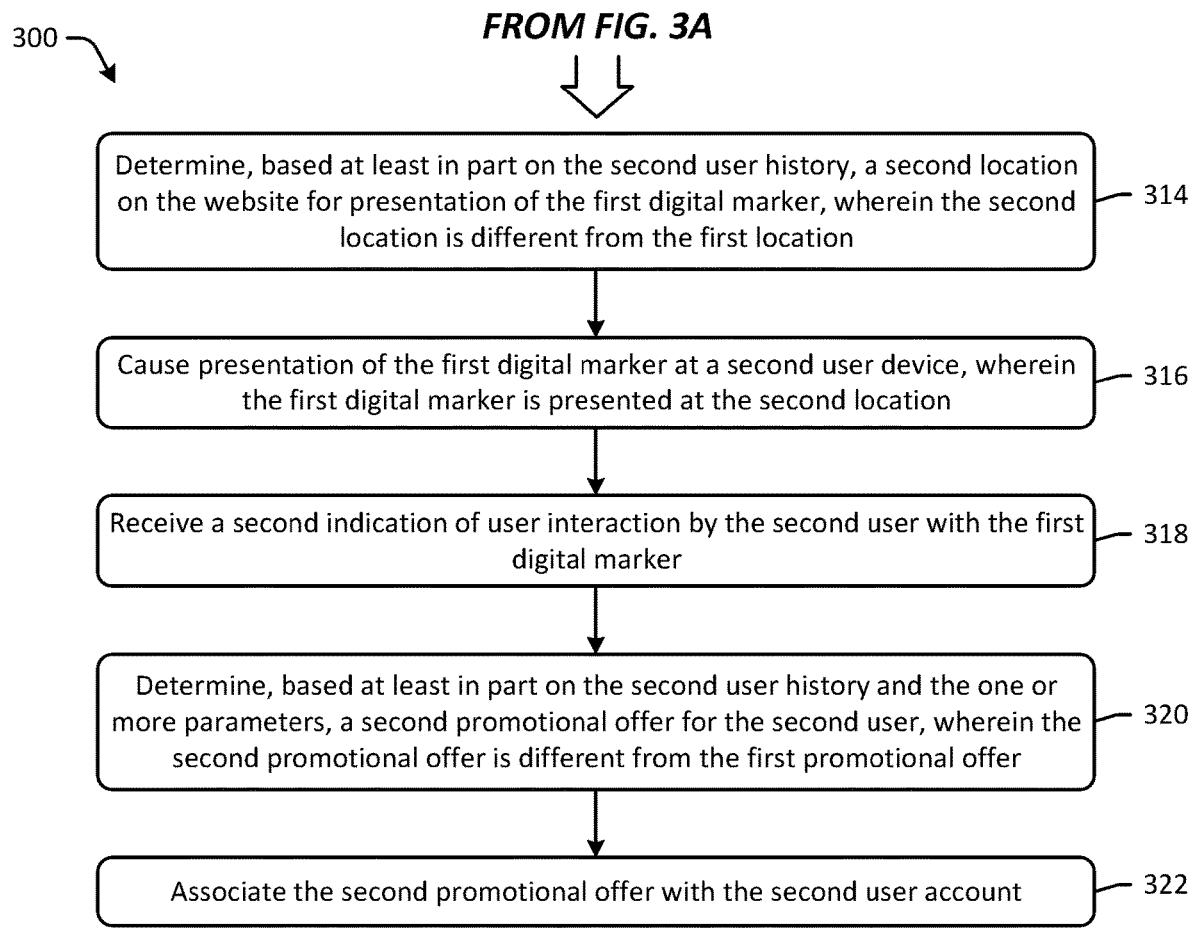

Referring to FIGS. 3A-3B, an example process flow 300 for dynamically determining personalized promotional offers using markers in accordance with one or more embodiments of the disclosure is depicted. Although certain operations are illustrated as occurring separately in FIGS. 3A-3B, some or all of the operations may occur concurrently or partially concurrently across one or more computer systems. In some embodiments, the operations of the process flow 300 may be executed by a remote server, such as a promotional offer determination server.

At block 302 of the process flow 300, a first user history associated with a first user account of a first user and a second user history associated with a second user account of a second user may be determined. For example, computer-executable instructions of one or more promotional offer determination module(s) stored at a server may be executed to determine a first user history associated with a first user account of a first user and a second user history associated with a second user account of a second user. The first user history may be indicative of interactions by the first user with an e-commerce marketplace, and the second user history may be indicative of interactions by the second user with the e-commerce marketplace.

At block 304 of the process flow 300, a first location on a website of the e-commerce marketplace for presentation of a first digital marker associated with a promotional offer campaign may be determined. For example, computer-executable instructions of one or more promotional offer determination module(s) stored at a server may be executed to determine a first location on a website of the e-commerce marketplace for presentation of a first digital marker associated with a promotional offer campaign. The promotional offer campaign may include a plurality of promotional offers, and the first digital marker may not be indicative of a promotional offer of the promotional offer campaign.

At block 306 of the process flow 300, a presentation of the first digital marker at a first user device may be caused. For example, computer-executable instructions of one or more promotional offer determination module(s) stored at a server may be executed to cause a presentation of the first digital marker at a first user device. The first digital marker may be presented at the first location.

At block 308 of the process flow 300, a first indication of user interaction by the first user with the first digital marker may be received. For example, computer-executable instructions of one or more promotional offer determination module(s) stored at a server may be executed to receive a first indication of user interaction by the first user with the first digital marker.

At block 310 of the process flow 300, a first promotional offer for the first user may be determined. For example, computer-executable instructions of one or more promotional offer determination module(s) stored at a server may be executed to determine a first promotional offer for the first user. The first promotional offer may be determined based at least in part on the first user history and one or more parameters of the promotional offer campaign.

At block 312 of the process flow 300, the first promotional offer may be associated with the first user account. For example, computer-executable instructions of one or more promotional offer determination module(s) stored at a server may be executed to associate the first promotional offer with the first user account.

At block 314 of the process flow 300, a second location on the website for presentation of the first digital marker may be determined. For example, computer-executable instructions of one or more promotional offer determination module(s) stored at a server may be executed to determine a second location on the website for presentation of the first digital marker. The second location may be different from the first location.

At block 316 of the process flow 300, a presentation of the first digital marker at a second user device may be caused. For example, computer-executable instructions of one or more promotional offer determination module(s) stored at a server may be executed to cause a presentation of the first digital marker at a second user device. The first digital marker may be presented at the second location.

At block 318 of the process flow 300, a second indication of user interaction by the second user with the first digital marker may be received. For example, computer-executable instructions of one or more promotional offer determination module(s) stored at a server may be executed to receive a second indication of user interaction by the second user with the first digital marker.

At block 320 of the process flow 300, a second promotional offer for the second user may be determined. For example, computer-executable instructions of one or more promotional offer determination module(s) stored at a server may be executed to determine a second promotional offer for the second user. The second promotional offer may be determined based at least in part on the second user history and the one or more parameters. The second promotional offer may be different from the first promotional offer.

At block 322 of the process flow 300, the second promotional offer may be associated with the second user account. For example, computer-executable instructions of one or more promotional offer determination module(s) stored at a server may be executed to associate the second promotional offer with the second user account.

Figure 4:
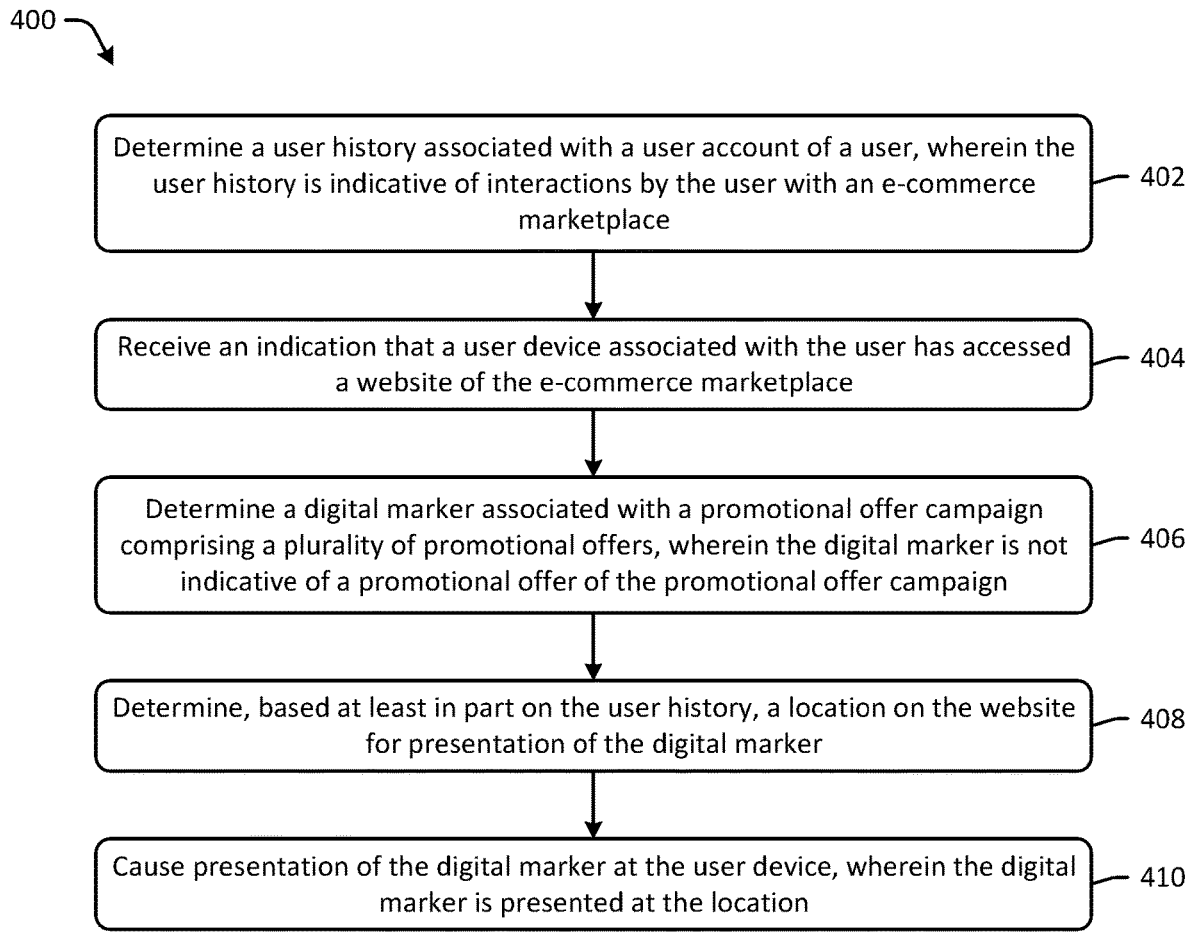
FIG. 4 is an example process flow diagram for dynamically determining a location for presentation of a digital marker associated with a promotional offer campaign in accordance with one or more embodiments of the disclosure.

Referring to FIG. 4, an example process flow 400 for dynamically determining a location for presentation of a digital marker associated with a promotional offer campaign in accordance with one or more embodiments of the disclosure is depicted. Although certain operations are illustrated as occurring separately in FIG. 4, some or all of the operations may occur concurrently or partially concurrently across one or more computer systems. In some embodiments, the operations of the process flow 400 may be executed by a remote server, such as a promotional offer determination server.

At block 402 of the process flow 400, a user history associated with a user account of a user may be determined. For example, computer-executable instructions of one or more promotional offer determination module(s) stored at a server may be executed to determine a user history associated with a user account of a user. The user history may be indicative of interactions by the user with an e-commerce marketplace.

At block 404 of the process flow 400, an indication that a user device associated with the user has accessed a website of the e-commerce marketplace may be received. For example, computer-executable instructions of one or more promotional offer determination module(s) stored at a server may be executed to receive an indication that a user device associated with the user has accessed a website of the e-commerce marketplace.

At block 406 of the process flow 400, a digital marker associated with a promotional offer campaign may be determined. For example, computer-executable instructions of one or more promotional offer determination module(s) stored at a server may be executed to determine a digital marker associated with a promotional offer campaign. The promotional offer campaign may include a plurality of promotional offers, and the digital marker may not be indicative of a promotional offer of the promotional offer campaign.

At block 408 of the process flow 400, a location on the website for presentation of the digital marker may be determined. For example, computer-executable instructions of one or more promotional offer determination module(s) stored at a server may be executed to determine a location on the website for presentation of the digital marker. The location may be determined based at least in part on the user history.

At block 410 of the process flow 400, a presentation of the digital marker at the user device may be caused. For example, computer-executable instructions of one or more promotional offer determination module(s) stored at a server may be executed to cause a presentation of the digital marker at the user device. The digital marker may be presented at the location.

One or more operations of the methods, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
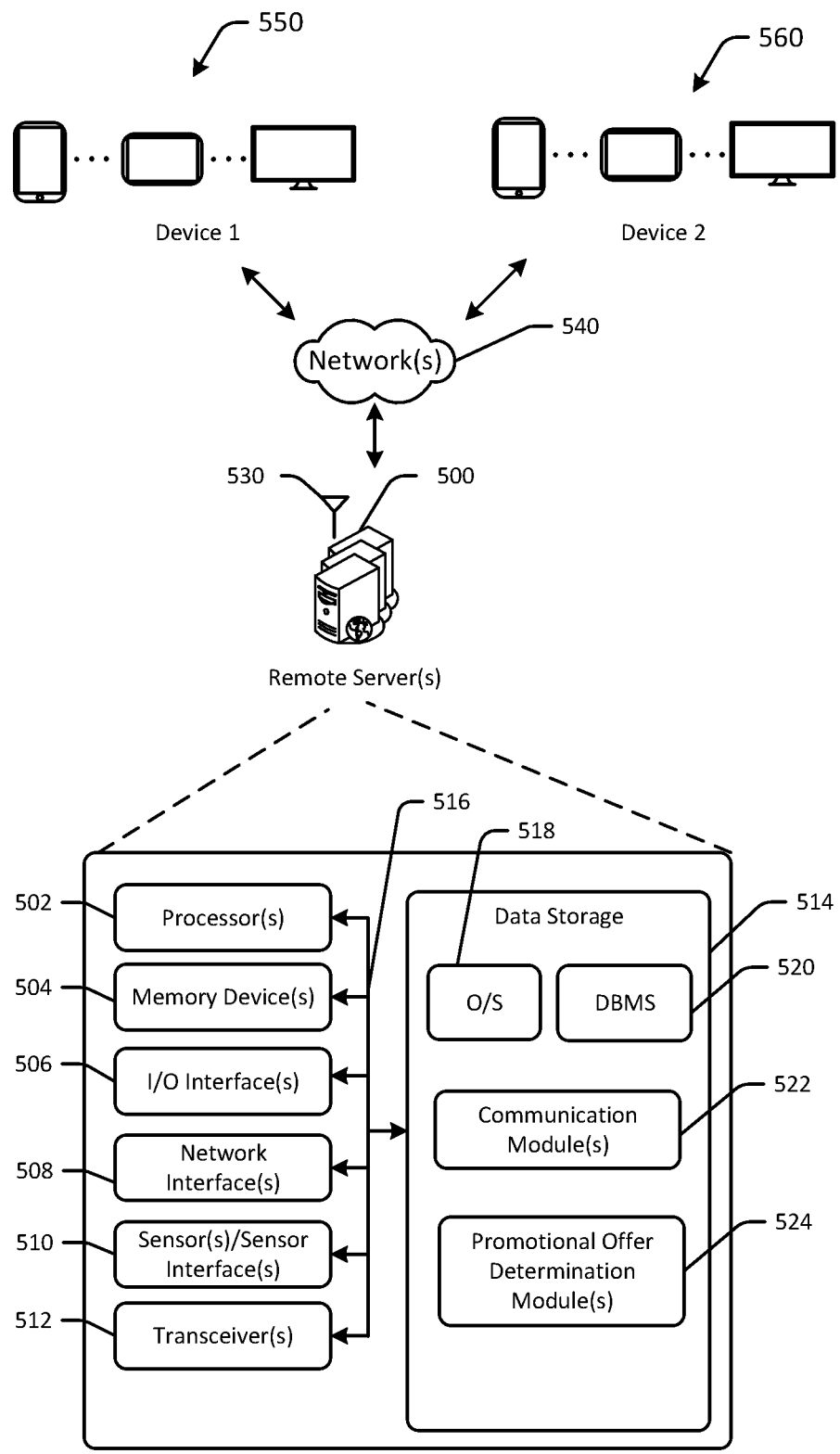
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the promotional offer determination server(s) of FIGS. 1-4.

The remote server(s) 500 may be configured to communicate via one or more networks with one or more servers, user devices, or the like. The remote server(s) 500 may be configured to manage one or more aspects of a number of content campaigns, such as content delivery parameters, distribution of content for presentation at respective delivery slots at a webpage or in an application, and other operations. The remote server(s) 500 may be configured to deliver or cause delivery of instructions and/or one or more pieces of content and may further be configured to determine a first user history associated with a first user account of a first user and a second user history associated with a second user account of a second user, the first user history being indicative of interactions by the first user with an e-commerce marketplace, and the second user history being indicative of interactions by the second user with the e-commerce marketplace, receiving a first indication of user interaction by the first user with a first marker associated with a promotional offer campaign, determine a first promotional offer for the first user based at least in part on the first user history, associate the first promotional offer with the first user account, receive a second indication of user interaction by the second user with the first marker, determine a second promotional offer for the second user based at least in part on the second user history, and associate the second promotional offer with the second user account. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540. The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522 and/or one or more promotional offer determination module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, product catalog information, transaction history information, product cost information, one or more expected performance models, one or more expected cost models, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The promotional offer determination module(s) 524 may include computer-executable instructions, code, or the like that responsive to execution by one or more of the processor(s) 502 may perform functions including, but not limited to, determining a first user history associated with a first user account of a first user and a second user history associated with a second user account of a second user, the first user history being indicative of interactions by the first user with an e-commerce marketplace, and the second user history being indicative of interactions by the second user with the e-commerce marketplace, receiving a first indication of user interaction by the first user with a first marker associated with a promotional offer campaign, determining a first promotional offer for the first user based at least in part on the first user history, associating the first promotional offer with the first user account, receive a second indication of user interaction by the second user with the first marker, determining a second promotional offer for the second user based at least in part on the second user history, and associating the second promotional offer with the second user account.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms that may be used interchangeably herein.

That which is claimed is:

1. A method comprising:
   determining, by one or more computer processors coupled to at least one memory, a first user history associated with a first user account of a first user and a second user history associated with a second user account of a second user, wherein the first user history is indicative of interactions by the first user with an e-commerce marketplace, and wherein the second user history is indicative of interactions by the second user with the e-commerce marketplace;
   determining, based at least in part on the first user history, a first location on a website of the e-commerce marketplace for presentation of a first digital marker associated with a promotional offer campaign comprising a plurality of promotional offers, wherein the first digital marker is not indicative of a promotional offer of the promotional offer campaign;
   causing presentation of the first digital marker at a first user device, wherein the first digital marker is presented at the first location;
   receiving a first indication of user interaction by the first user with the first digital marker;
   determining, based at least in part on the first user history and one or more parameters of the promotional offer campaign, a first promotional offer for the first user, wherein the one or more parameters comprises at least one of: (i) a frequency parameter indicative of a predetermined frequency for awarding one of the plurality of promotional offers; (ii) a maximum promotional offer parameter indicative of a predetermined maximum number of one of the plurality of promotional offers to be awarded to users; (iii) a maximum promotional offer per user parameter indicative of a predetermined maximum number of one of the plurality of promotional offers to be awarded to a single user; (iv) a timing parameter indicative of a predetermined time period for awarding one of the plurality of promotional offers; or (v) a user location parameter indicative of one or more geographic locations of users for awarding one of the plurality of promotional offers;
   associating the first promotional offer with the first user account;
   determining, based at least in part on the second user history, a second location on the website for presentation of the first digital marker, wherein the second location is different from the first location;

causing presentation of the first digital marker at a second user device, wherein the first digital marker is presented at the second location;
receiving a second indication of user interaction by the second user with the first digital marker;
determining, based at least in part on the second user history and the one or more parameters, a second promotional offer for the second user, wherein the second promotional offer is different from the first promotional offer; and
associating the second promotional offer with the second user account.

2. The method of claim 1, wherein the first user history comprises at least one of: (i) a browse history associated with the first user account and indicative of digital content browsed by the first user, (ii) a purchase history associated with the first user account and indicative of products purchased by the first user, (iii) a marker interaction history associated with the first user account and indicative of user interactions by the first user with digital markers associated with the promotional offer campaign, or (iv) a promotional offer history associated with the first user account and indicative of promotional offers of the promotional offer campaign redeemed by the first user.

3. The method of claim 1, further comprising:
determining, based at least in part on the first user history, a third location on the website for presentation of a second digital marker associated with the promotional offer campaign;
causing presentation of the second digital marker at the first user device, wherein the second digital marker is presented at the third location;
receiving a third indication of user interaction by the first user with the second digital marker;
determining, based at least in part on the first user history and the one or more parameters, a third promotional offer for the first user;
associating the third promotional offer with the first user account;
determining, based at least in part on the second user history, a fourth location on the website for presentation of the second digital marker, wherein the fourth location is different from the third location;
causing presentation of the second digital marker at the second user device, wherein the second digital marker is presented at the fourth location;
receiving a fourth indication of user interaction by the second user with the second digital marker;
determining, based at least in part on the second user history or the one or more parameters, that no promotional offer is to be associated with the second user account.

4. The method of claim 1, further comprising:
determining, based at least in part on the first user history, a third location on the website for presentation of a second digital marker associated with the promotional offer campaign;
causing presentation of the second digital marker at the first user device, wherein the second digital marker is presented at the third location;
receiving a third indication of user interaction by the first user with the second digital marker;
determining, based at least in part on the first user history and the one or more parameters, a third promotional offer for the first user;
associating the third promotional offer with the first user account;

determining, based at least in part on the second user history or the one or more parameters, that the second digital marker is not to be presented at the second user device.

5. A method comprising:
determining, by one or more computer processors coupled to at least one memory, a first user history associated with a first user account of a first user and a second user history associated with a second user account of a second user, wherein the first user history is indicative of interactions by the first user with a marketplace, and wherein the second user history is indicative of interactions by the second user with the marketplace;
determining, based at least in part on the first user history, a first location at which to display a first marker associated with a promotional offer campaign;
receiving a first indication of user interaction by the first user with the first marker, wherein the first marker is not indicative of a promotional offer of the promotional offer campaign;
determining, based at least in part on the first user history, a first promotional offer for the first user;
associating the first promotional offer with the first user account;
determining, based at least in part on the second user history, a second location at which to display the first marker;
receiving a second indication of user interaction by the second user with the first marker;
determining, based at least in part on the second user history, a second promotional offer for the second user, wherein the second promotional offer is different from the first promotional offer; and
associating the second promotional offer with the second user account.

6. The method of claim 5, wherein the first marker is a first digital marker, the method further comprising:
determining, based at least in part on the first user history, the first location associated with the marketplace for presentation of the first digital marker;
causing presentation of the first digital marker at a first user device, wherein the first digital marker is presented at the first location;
causing presentation of first promotional offer content at the first user device, wherein the first promotional offer content is indicative of the first promotional offer;
determining, based at least in part on the second user history, the second location associated with the marketplace for presentation of the first digital marker, wherein the second location is different from the first location;
causing presentation of the first digital marker at a second user device, wherein the first digital marker is presented at the second location; and
causing presentation of second promotional offer content at the second user device, wherein the second promotional offer content is indicative of the second promotional offer.

7. The method of claim 6, wherein determining the first promotional offer for the first user comprises determining the first promotional offer for the first user before receiving the first indication of user interaction by the first user with the first marker, and wherein determining the second promotional offer for the second user comprises determining the second promotional offer for the second user before receiving the second indication of user interaction by the second user with the first marker.

8. The method of claim 6, wherein determining the first promotional offer for the first user comprises determining the first promotional offer for the first user based at least in part on the first user history and the first location, and wherein determining the second promotional offer for the second user comprises determining the second promotional offer for the second user based at least in part on the second user history and the second location.

9. The method of claim 6, wherein receiving the first indication of user interaction by the first user with the first marker comprises receiving the first indication of user interaction by the first user with the first marker from the first user device, wherein the first indication is indicative of user selection of the first digital marker, wherein receiving the second indication of user interaction by the second user with the first marker comprises receiving the second indication of user interaction by the second user with the first marker from the second user device, and wherein the second indication is indicative of user selection of the first digital marker.

10. The method of claim 6, further comprising:
determining, based at least in part on the first user history, a third location associated with the marketplace for presentation of a second digital marker associated with the promotional offer campaign;
causing presentation of the second digital marker at the first user device, wherein the second digital marker is presented at the third location;
receiving a third indication of user interaction by the first user with the second digital marker;
determining, based at least in part on the first user history, a third promotional offer for the first user;
associating the third promotional offer with the first user account;
determining, based at least in part on the second user history, a fourth location associated with the marketplace for presentation of the second digital marker, wherein the fourth location is different from the third location;
causing presentation of the second digital marker at the second user device, wherein the second digital marker is presented at the fourth location;
receiving a fourth indication of user interaction by the second user with the second digital marker;
determining, based at least in part on the second user history, that no promotional offer is to be associated with the second user account.

11. The method of claim 6, further comprising:
determining, based at least in part on the first user history, a third location associated with the marketplace for presentation of a second digital marker associated with the promotional offer campaign;
causing presentation of the second digital marker at the first user device, wherein the second digital marker is presented at the third location;
receiving a third indication of user interaction by the first user with the second digital marker;
determining, based at least in part on the first user history, a third promotional offer for the first user;
associating the third promotional offer with the first user account;
determining, based at least in part on the second user history, that the second digital marker is not to be presented at the second user device.

12. The method of claim 5, further comprising:
receiving a third indication of user interaction by the first user with a second marker associated with the promotional offer campaign, wherein the second marker is not indicative of a promotional offer of the promotional offer campaign;
determining, based at least in part on the first user history, a third promotional offer for the first user, wherein the first user history comprises at least one of: (i) a marker interaction history associated with the first user account and indicative of the user interaction by the first user with the first marker; or (ii) a promotional offer history associated with the first user account and indicative of the first promotional offer; and
associating the third promotional offer with the first user account.

13. The method of claim 5, wherein the first marker is a first physical marker, wherein the first indication of user interaction by the first user with the first marker comprises a first image of the first physical marker received from a first user device associated with the first user, and wherein the second indication of user interaction by the second user with the first marker comprises a second image of the first physical marker received from a second user device associated with the second user.

14. The method of claim 13, further comprising:
causing presentation of first promotional offer content at the first user device, wherein the first promotional offer content comprises first augmented reality content indicative of the first promotional offer; and
causing presentation of second promotional offer content at the second user device, wherein the second promotional offer content comprises second augmented reality content indicative of the second promotional offer.

15. The method of claim 5, wherein the first user history comprises at least one of: (i) a browse history associated with the first user account and indicative of digital content browsed by the first user, (ii) a purchase history associated with the first user account and indicative of products purchased by the first user, (iii) a marker interaction history associated with the first user account and indicative of user interactions by the first user with markers associated with the promotional offer campaign, or (iv) a promotional offer history associated with the first user account and indicative of promotional offers of the promotional offer campaign redeemed by the first user.

16. The method of claim 5, wherein determining the first promotional offer for the first user comprises determining the first promotional offer for the first user based at least in part on the first user history and one or more parameters of the promotional offer campaign, and wherein the one or more parameters comprises at least one of: (i) a frequency parameter indicative of a predetermined frequency for awarding the first promotional offer; (ii) a maximum promotional offer parameter indicative of a predetermined maximum number of the first promotional offer to be awarded to users; (iii) a maximum promotional offer per user parameter indicative of a predetermined maximum number of the first promotional offer to be awarded to a single user; (iv) a timing parameter indicative of a predetermined time period for awarding the first promotional offer; or (v) a user location parameter indicative of one or more geographic locations of users for awarding the first promotional offer.

17. A device comprising:
at least one memory that stores computer-executable instructions; and
at least one processor configured to access the at least one memory and execute the computer-executable instructions to:

determine a first user history associated with a first user account of a first user and a second user history associated with a second user account of a second user, wherein the first user history is indicative of interactions by the first user with a marketplace, and wherein the second user history is indicative of interactions by the second user with the marketplace;

determine, based at least in part on the first user history, a first location at which to display a first marker associated with a promotional offer campaign;

receive a first indication of user interaction by the first user with a first marker associated with a promotional offer campaign, wherein the first marker is not indicative of a promotional offer of the promotional offer campaign;

determine, based at least in part on the first user history, a first promotional offer for the first user;

associate the first promotional offer with the first user account;

determine, based at least in part on the second user history, a second location at which to display the first marker;

receive a second indication of user interaction by the second user with the first marker;

determine, based at least in part on the second user history, a second promotional offer for the second user, wherein the second promotional offer is different from the first promotional offer; and associating the second promotional offer with the second user account.

18. The device of claim 17, wherein the first marker is a first digital marker, and wherein the at least one processor is further configured to access the at least one memory and execute the computer-executable instructions to:

determine, based at least in part on the first user history, the first location associated with the marketplace for presentation of the first digital marker;

cause presentation of the first digital marker at a first user device, wherein the first digital marker is presented at the first location;

cause presentation of first promotional offer content at the first user device, wherein the first promotional offer content is indicative of the first promotional offer;

determine, based at least in part on the second user history, the second location associated with the marketplace for presentation of the first digital marker, wherein the second location is different from the first location;

cause presentation of the first digital marker at a second user device, wherein the first digital marker is presented at the second location; and cause presentation of second promotional offer content at the second user device, wherein the second promotional offer content is indicative of the second promotional offer.

19. The device of claim 17, wherein the first marker is a first physical marker, wherein the first indication of interaction by the first user with the first marker comprises a first image of the first physical marker received from a first user device associated with the first user, wherein the second indication of interaction by the second user with the first marker comprises a second image of the first physical marker received from a second user device associated with the second user, and wherein the at least one processor is further configured to access the at least one memory and execute the computer-executable instructions to:

cause presentation of first promotional offer content at the first user device, wherein the first promotional offer content comprises first augmented reality content indicative of the first promotional offer; and cause presentation of second promotional offer content at the second user device, wherein the second promotional offer content comprises second augmented reality content indicative of the second promotional offer.

20. The device of claim 17, wherein the first user history comprises at least one of: (i) a browse history associated with the first user account and indicative of digital content browsed by the first user, (ii) a purchase history associated with the first user account and indicative of products purchased by the first user, (iii) a marker interaction history associated with the first user account and indicative of user interactions by the first user with markers associated with the promotional offer campaign, or (iv) a promotional offer history associated with the first user account and indicative of promotional offers of the promotional offer campaign redeemed by the first user.

* * * * *